(12) United States Patent
Miller

(10) Patent No.: US 12,497,164 B2
(45) Date of Patent: Dec. 16, 2025

(54) METHODS AND BRAKE SYSTEMS TO REDUCE BRAKE WEAR DURING AIRCRAFT TAXIING

(71) Applicant: The Boeing Company, Chicago, IL (US)

(72) Inventor: Trent Daryl Miller, Seattle, WA (US)

(73) Assignee: The Boeing Company, Arlington, VA (US)

( * ) Notice: Subject to any disclaimer, the term of this patent is extended or adjusted under 35 U.S.C. 154(b) by 415 days.

(21) Appl. No.: 17/526,765

(22) Filed: Nov. 15, 2021

(65) Prior Publication Data

US 2022/0185460 A1      Jun. 16, 2022

Related U.S. Application Data

(60) Provisional application No. 63/126,287, filed on Dec. 16, 2020.

(51) Int. Cl.
    *B64C 25/42* (2006.01)
    *B60T 8/17* (2006.01)
    (Continued)

(52) U.S. Cl.
    CPC .......... *B64C 25/426* (2013.01); *B60T 8/1703* (2013.01); *B60T 8/172* (2013.01); *B60T 2250/04* (2013.01); *F16D 2066/006* (2013.01)

(58) Field of Classification Search
    CPC ..... B64C 25/426; B60T 8/1703; B60T 8/172; B60T 2250/04; F16D 2066/006
    See application file for complete search history.

(56) References Cited

U.S. PATENT DOCUMENTS

| 647,852 A | 4/1900 | Loch |
| 4,591,213 A | 5/1986 | Rapoport |

(Continued)

FOREIGN PATENT DOCUMENTS

| CA | 3167980 A1 | 8/2019 |
| CN | 100540370 | 9/2009 |

(Continued)

OTHER PUBLICATIONS

Guy Di Santo, "Proper Operation of Carbon Brakes", Nov. 15, 2013, Code 7700, Airbus Flight Operations Support—11th Performance and Operations Conference. https://code7700.com/carbon-carbon_brakes.htm (Year: 2013).*

(Continued)

*Primary Examiner* — Andrew J Cromer
(74) *Attorney, Agent, or Firm* — Kolitch Romano Dascenzo Gates LLC

(57) ABSTRACT

Methods for reducing brake wear during aircraft taxiing are disclosed. As one example, a method comprises determining a sequence to apply brakes of a given set of landing gear during a brake event, wherein the determining includes selecting a warmer brake of the brakes to initially apply at a start of the brake event, and selecting a cooler brake of the brakes to subsequently apply when the warmer brake is released during the brake event. The method further comprises applying the warmer brake and the cooler brake in the determined sequence during the brake event. In another example, an aircraft brake system comprises brakes and a controller that is programmed to, during taxiing, apply a warmer subset of the brakes before applying a cooler subset of the brakes during a brake event.

20 Claims, 4 Drawing Sheets

(51) Int. Cl.
*B60T 8/172* (2006.01)
*F16D 66/00* (2006.01)

(56) References Cited

U.S. PATENT DOCUMENTS

| | | |
|---|---|---|
| 4,923,056 A | 5/1990 | Nedelk |
| 4,984,852 A | 1/1991 | McNinch, Jr. |
| 4,986,610 A | 1/1991 | Beck et al. |
| 5,845,975 A | 12/1998 | Wells |
| 6,398,162 B1 | 6/2002 | Stimson et al. |
| 6,478,252 B1 * | 11/2002 | Stimson ............... B60T 13/66 188/264 R |
| 6,604,708 B1 | 8/2003 | DeVlieg |
| 7,165,815 B1 | 1/2007 | Huang |
| 8,386,094 B2 | 2/2013 | DeVlieg et al. |
| 8,548,652 B2 | 10/2013 | DeVlieg et al. |
| 9,061,661 B2 | 6/2015 | Vaney et al. |
| 2006/0226698 A1 | 10/2006 | Riebe et al. |
| 2008/0249675 A1 | 10/2008 | Goodman et al. |
| 2011/0127828 A1 | 6/2011 | Sorin et al. |
| 2018/0079402 A1 * | 3/2018 | Brüggemann ........ B64C 25/426 |
| 2021/0001823 A1 * | 1/2021 | Georgin ............... B60T 8/1703 |

FOREIGN PATENT DOCUMENTS

| | | |
|---|---|---|
| EP | 3359433 A1 | 4/2017 |
| EP | 3088266 | 11/2018 |

OTHER PUBLICATIONS

Machine-generated English translation of the abstract of CN 100540370, downloaded from Espacenet.com Oct. 7, 2020.

European Patent Office, Extended European Search Report for related European Patent Application No. 21194231, dated Feb. 3, 2022.

English language machine-generated translation of Canada Patent Application Publication No. CA3167980A1, published Aug. 19, 2021.

Canada Intellectual Property Office, examination report issued for Application No. 3,129,798, dated Feb. 1, 2024.

* cited by examiner

METHODS AND BRAKE SYSTEMS TO REDUCE BRAKE WEAR DURING AIRCRAFT TAXIING

RELATED APPLICATION

The present application is a non-provisional of and claims priority to U.S. Provisional Patent Application No. 63/126,287, filed on Dec. 16, 2020, entitled "METHODS AND BRAKE SYSTEMS TO REDUCE BRAKE WEAR DURING AIRCRAFT TAXIING," the complete disclosure of which is incorporated by reference.

FIELD

The present disclosure relates to reducing brake wear during aircraft taxiing.

BACKGROUND

Unlike steel brakes, which wear based directly on the amount of energy they absorb (i.e., how long and hard they are applied), carbon brakes wear primarily based on their temperature and the number of times they are applied. Thus, one firm brake application, particularly when performed near a carbon brake's optimal wear temperature, may wear a carbon brake less than several light brake applications. As for temperature, carbon brakes wear least when warm, but not too hot. As such, applying carbon brakes when they are cold and/or very hot may cause excessive brake wear.

Because brakes may be cooler and/or applied more times during the taxi portion of flight, taxiing may be responsible for much of a carbon brake's total wear. Thus, even though landing may demand significantly higher braking forces than taxiing, carbon brakes may nonetheless wear more during the taxi portion of flight than landing.

Conventional taxi brake approaches cycle which brakes are applied during taxiing according to a predetermined schedule, such as a repeating sequence. However, such approaches ignore the aforementioned factors that heavily influence carbon brake wear (e.g., brake temperature), leading to excessive brake wear and premature brake degradation. As such, brake methods that minimize carbon brake wear during this taxi portion of flight are desired.

SUMMARY

Methods for reducing brake wear during aircraft taxiing are disclosed. For example, a method for reducing brake wear during taxiing of an aircraft comprises determining a sequence to apply brakes of a given set of landing gear during a brake event, wherein the determining includes selecting a warmer brake of the brakes to initially apply at a start of the brake event, and selecting a cooler brake of the brakes to subsequently apply when the warmer brake is released during the brake event. The method further includes applying the warmer brake and the cooler brake in the determined sequence during the brake event. In some examples, the applying the warmer brake and the cooler brake in the determined sequence comprises initially applying the warmer brake at the start of the brake event, releasing the warmer brake when it reaches a transition temperature and/or a transition energy threshold, and/or when a velocity of the aircraft reaches a transition velocity, and applying the cooler brake when releasing the warmer brake. In some examples, initially applying the warmer brake comprises applying a warmest subset of the brakes that are available for braking, and the applying the cooler brakes comprises applying a next warmest subset of the brakes.

In another example, an aircraft brake system comprises brakes and a controller that is programmed to, during taxiing, apply a warmer subset of the brakes before applying a cooler subset of the brakes during a brake event. In some such examples, the controller further is programmed to estimate a current brake energy for each of the brakes by adding a latent heat estimate and an accumulated heat estimate. In some such examples, the controller further is programmed to calculate the latent heat estimate by converting the temperature measurement to an energy value via a known relationship between brake temperature measurements and brake energies. In some such examples, the controller further is programmed to calculate the accumulated heat estimate based on instances of aircraft deceleration during taxiing and based on one or more of which of the brakes were applied during said instances of aircraft deceleration and an amount of kinetic energy lost during said instances of aircraft deceleration. In some such examples, the controller further is programmed to only apply brakes for which the current brake energy is less than a transition energy threshold by more than a buffer energy value.

DESCRIPTION

Figure 1:
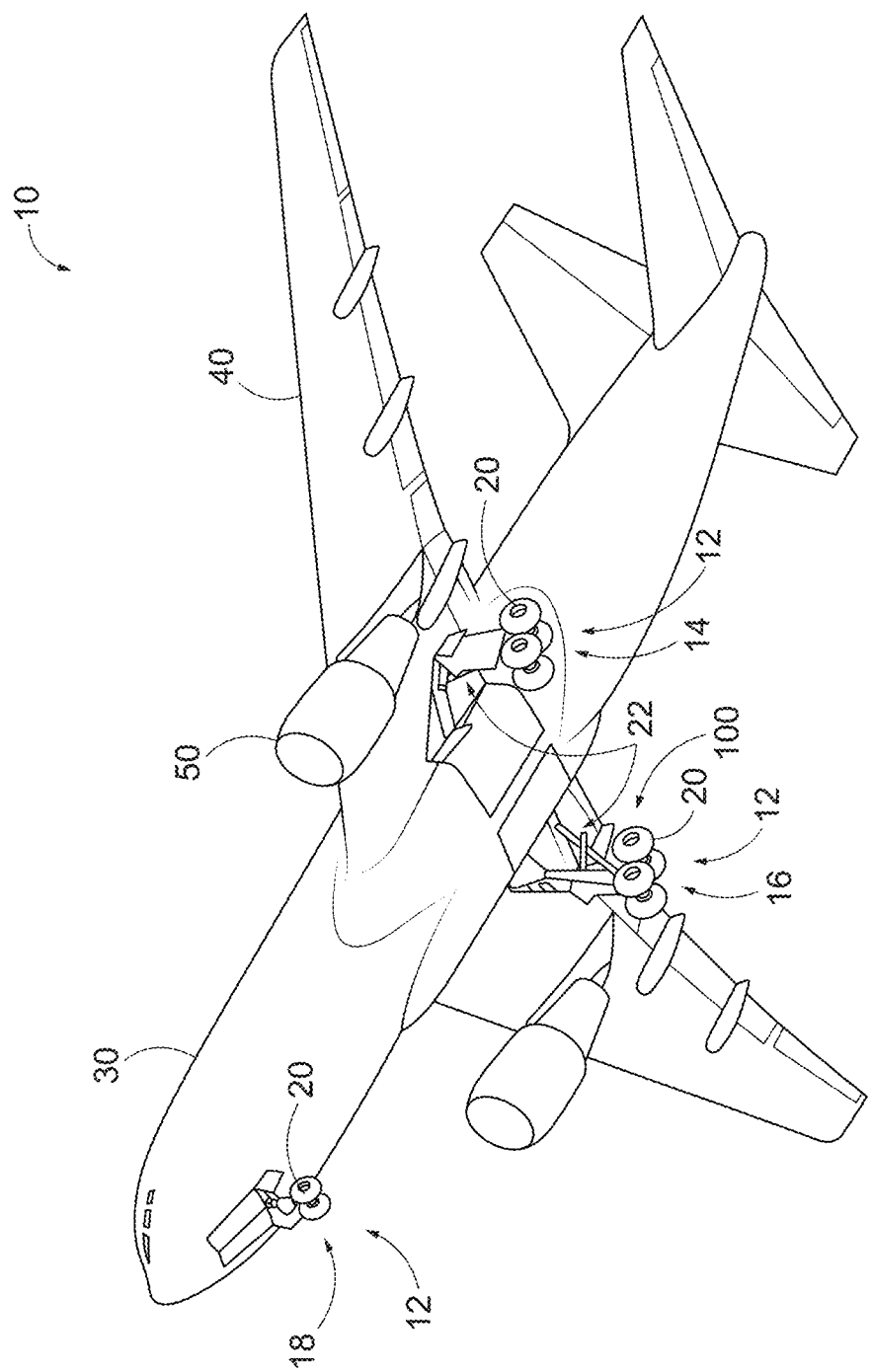
FIG. 1 is a schematic representation of an example aircraft that includes a brake system, according to the present disclosure.

Methods for reducing brake wear during aircraft taxiing are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

The methods of the present disclosure are performed during the aircraft taxiing portions of a flight cycle, and may be employed to minimize carbon brake wear during high carbon brake wear conditions (i.e., conditions where significant and/or excessive carbon brake wear is more likely). For example, high carbon brake wear conditions may exist when one or more of an aircraft's carbon brakes are sufficiently cold. In particular, carbon brakes tend to wear more when they are cold (i.e., below a threshold temperature), which may occur when the brakes have not been applied for a period of time and/or have been applied only lightly and/or infrequently. As examples, high carbon brake wear conditions may exist once a sufficient amount of time has passed after landing (i.e., enough time to allow the brakes to cool off), and/or during taxi to takeoff where the brakes may be cold after being idle for a prolonged period of time between flight cycles. In some examples, the brake wear minimization methods of the present disclosure are performed only when the high carbon brake wear conditions exist.

To ensure the brake wear minimization methods are performed when they should be, the methods of the present disclosure optionally include confirming whether the high carbon brake wear conditions exist before proceeding to operate in a high brake wear minimization mode. In some examples, if the high carbon brake wear conditions exist, then the methods include operating in the high brake wear minimization mode. Operating in the high brake wear minimization mode includes independently adjusting the braking force of each brake to achieve a desired braking force based on the current brake temperature of each of the brakes and the remaining brake energy available for each of the brakes (which depends on how hot the brakes are allowed to get (i.e., a maximum permissible brake temperature)). In particular, operating in the high brake wear minimization mode includes applying brakes currently in a lower-wear state (brakes that will experience less wear when applied than brakes in a higher-wear state) before applying brakes in a higher-wear state (brakes that will experience more wear than brakes in the lower-wear state). As explained above, since carbon brake wear is temperature-dependent, operating in the high brake wear minimization mode may include applying the brakes in an order that is based on the brakes' temperatures. Specifically, since warmer brakes generally may wear less than cooler brakes, the operating in the high brake wear minimization mode may include applying warmer brakes (and/or brakes at a more optimal temperature where less brake wear is likely to occur) before and/or instead of applying cooler brakes (and/or brakes at a less optimal temperature where more brake wear is likely to occur) during a brake event (i.e., a period where braking is desired, such as from when an operator initially depresses a brake pedal to when the operator releases the brake pedal), also referred to herein as a "brake cycle." Thus, by applying the brakes based on their temperature, brakes that are closer to an optimal brake wear temperature (temperature at which the least amount of brake wear occurs) may be applied first when braking is desired. In some examples, the optimal brake wear temperature may be at least 150° C. and at most 370° C.

In this way, the methods of the present disclosure may reduce and/or avoid application of cold and/or cooler brakes that are more likely to experience excessive wear, thereby minimizing overall wear of the carbon brakes. Said another way, the methods disclosed herein select and apply the brakes that are likely to experience the least amount of wear (based on at least the temperature of the brakes) before resorting to applying higher-wear brakes. That is, brakes that are likely to experience more wear (e.g., cold brakes) are only applied when needed, such as after the lower-wear brakes (e.g., warmer brakes) reach a maximum permissible temperature.

In particular, since brakes operate by converting an aircraft's kinetic energy into thermal energy (heat), brakes get hotter the longer and harder they are applied (i.e., the more kinetic energy they absorb). Thus, a brake's braking capacity (i.e., its remaining energy available for braking) is inversely proportional to its temperature. The hotter a brake gets, the less energy it has left for braking. Indeed, in complying with airplane regulations, aircraft manufacturers limit how hot aircraft brakes can get during normal operations. That is, regulations set maximum brake temperatures that cannot be exceeded prior to or during flight. Thus, the methods herein include minimizing carbon brake wear within these established brake temperature constraints. Accordingly, the methods optionally include executing the various brake wear minimization actions disclosed herein while also observing applicable brake temperature restrictions. This may include managing and/or balancing the desire to minimize brake wear with the need to observe the prescribed brake temperature ceilings.

In one example, once the warmer brakes reach a transition temperature, which also may be referred to as a transition temperature threshold or as threshold temperature, the methods herein include switching and/or transitioning to cooler brakes by releasing the warmer brakes and applying the cooler brakes. As one such example, the methods herein include first applying the warmest subset of brakes that are available for braking (i.e., the warmest subset of brakes that are below the transition temperature), and, once these brakes reach the transition temperature, transitioning to applying the next warmest set of brakes, if braking is still desired (i.e., the brake event has not yet terminated). In some such examples, the transition temperature is set and/or adjusted based on the current stage in the flight cycle. As an example, prior to takeoff, brakes may need to be kept cooler than after landing to ensure that the brakes have sufficient thermal capacity to perform a rejected takeoff without exceeding the maximum permissible brake temperature. In this way, carbon brakes may be selected and/or applied based on their temperature to minimize brake wear while ensuring that the brakes still have sufficient thermal capacity to handle all possible future braking needs.

In some examples, the warmer brakes are applied only if they still have sufficient braking capacity (i.e., they are below the transition temperature by more than a buffer value). This may reduce transient brake applications, and therefore reduce the total number brakes applied during a single brake event and/or the number of times a given brake is applied during a single brake event, thereby further minimizing carbon brake wear. In particular, brakes that are too warm (e.g., within the buffer value of the transition temperature) may need to be released so soon after they are applied, that they can only be applied for a very short portion of the brake event. Thus, the methods disclosed herein may prevent such transient, superfluous brake applications by ensuring that only brakes with sufficient remaining brake energy are applied during the upcoming brake event. In this way, the number of brakes applied during a brake event and/or the number of times a given brake is applied during the brake event may be reduced, thereby further minimizing carbon brake wear during the brake event.

In some examples, the brake temperature is estimated based on measurements received from a brake temperature sensor. However, the brake temperature sensor may not immediately register changes in brake temperature, and the brake temperature registered by the brake temperature sensor may lag behind the actual brake temperature. As explained above, since the brakes absorb an aircraft's kinetic energy by converting it to thermal energy, the brake temperature increases when the brakes are applied. Thus, in some examples, more recent temperature changes in the brakes (i.e., changes that have occurred during the delay/lag period of the brake temperature sensor) may be estimated based on an amount of kinetic energy recently absorbed by the brakes. In this way, a brake controller may more accurately estimate the current temperature of the brakes by accounting for recent changes in the brakes' temperatures that may not be reflected in the brake temperature measurements received from the brake temperature sensors. Thus, by estimating the current brake temperature based on the energy absorbed by the brakes during recent brake applications, the methods disclosed herein may provide more accurate, sensitive brake temperature estimates.

FIG. 1 is a schematic illustration of an example aircraft 10 that includes brake systems 100 according to the present disclosure. Aircraft 10 generally may be utilized to transport persons and/or cargo. As illustrated in FIG. 1, aircraft 10 generally includes a fuselage 30, a wing assembly 40 operatively coupled to fuselage 30, and engines 50 operatively coupled to wing assembly 40. Further, aircraft 10 includes two or more sets of landing gear 12. As an example, two or more sets of landing gear 12 include a left-side set of landing gear 14, a right-side set of landing gear 16, and a nose set of landing gear 18. Each of the two or more sets of landing gear include wheels 20 and a strut assembly 22 that operatively couples the landing gear to the fuselage and/or the wing assembly. Brake systems 100 operatively control a braking force applied to wheels 20. As will be described in greater detail below with reference to FIGS. 2 and 3, brake systems 100 may include a controller that is programmed to select which of the brakes to initially apply during an upcoming brake event and/or to determine a sequence in which to apply the brakes during the upcoming brake event to minimize brake wear during the brake event. In some examples, the brakes and/or brake sequence are selected based on brake temperature.

Figure 2:
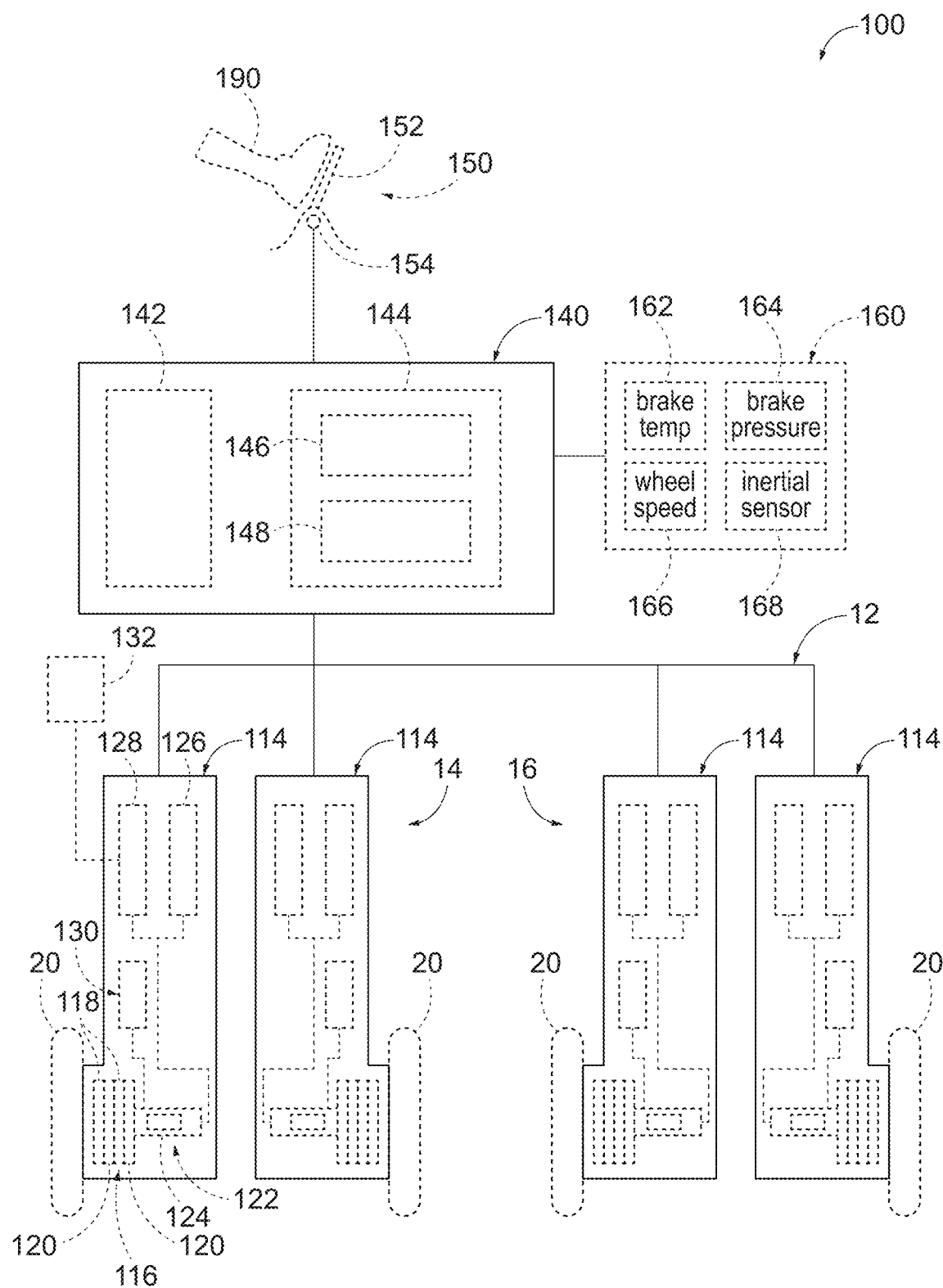
FIG. 2 is schematic diagram representing a brake system, according to the present disclosure.

As schematically illustrated in FIG. 2, brake systems 100 include brakes 114 and a controller 140. Brakes 114 are configured to apply braking forces to wheels 20 and controller 140 is programmed to selectively operate each of the brakes during aircraft taxiing to independently adjust the braking force applied by each of the brakes based on brake temperature. As one example, controller 140 is programmed to apply a warmer subset of the brakes before applying a cooler subset of the brakes when a braking force becomes desired during taxiing (i.e., during a brake event).

Brakes 114 are configured to apply braking forces to wheels 20 to slow down wheels 20 (and thus aircraft 10) by absorbing the aircraft's kinetic energy and converting it to thermal energy (i.e., heat) via frictional forces. As one example, each of brakes 114 includes a plurality of friction plates 116 (also referred to herein as "brake discs 116") that are configured to be selectively compressed against one another to generate friction therebetween and thereby increase the amount of braking force applied to wheels 20 by the brakes. In some such examples, the braking force applied by brakes 114 to wheels 20 is directly proportional to the compressive force applied to the plurality of friction plates.

In one example, the plurality of friction plates includes one or more rotor plates 118 that are configured to co-rotate with wheels 20, and one or more stator plates 120 that are configured to rotate independently of the one or more rotor plates and the wheels when braking forces are not being applied (e.g., when the plurality of friction plates are not being compressed). When the one or more rotor plates and the one or more stator plates are compressed together, friction between the one or more rotor plates and the one or more stator plates provides a braking force that slows down wheels 20.

In one example, one or more rotor plates 118 are locked in place relative to wheels 20 such that the one or more rotor plates do not rotate relative to wheels 20 (i.e., they rotate with the wheels). Conversely, one or more stator plates 120 are not fixedly secured to wheels 20 and instead are only connected to wheels 20 when touching and/or otherwise engaging one or more rotors plates 118 (which may occur only when one or more stator plates 120 and one or more rotors plates 118 are compressed together, such as when braking forces are being applied by the brakes). Even when touching one or more rotor plates 118, one or more stator plates 120 are only indirectly connected to wheels 20 via frictional engagement with the one or more rotor plates.

In some examples, brakes 114 are carbon brakes. In some such examples, the plurality of friction plates 116 is constructed from a carbon-based material, such as carbon fiber. In one such example, the carbon fiber is carbonized (i.e., the non-carbon atoms are removed from the carbon fiber) by heating the carbon fiber in a furnace to extreme temperatures (e.g., 1,000-3,000° C.). The resulting carbonized material may be relatively porous and may include very tightly bonded carbon crystals. In some examples, reactant gases are injected into the voids of the porous carbonized material and may react with the carbonized material to form deposits on the carbonized material that may serve as a base for a matrix.

In some examples, each of brakes 114 includes one or more actuating mechanisms 122 that are configured to selectively compress the plurality of plurality of friction plates (to adjust the amount of braking force applied the brakes, as described above). As an example, actuating mechanisms 122 include a driving element 124 that is configured to translate and/or move relative to the plurality of friction plates to provide a compressive force to (i.e., compress) the plurality of friction plates, and one or more actuators, such as a first actuator 126 and/or a second actuator 128, that are configured to translate and/or move the driving element 124. As one such example, driving element 124 comprises a piston that is configured to oscillate, reciprocate, and/or otherwise translate relative to the plurality of friction plates to adjust the compressive force supplied to the plurality of friction plates.

First actuator 126 and second actuator 128, when included, can include or take the form of one or more pneumatic, hydraulic, and/or mechanical actuators that are electronically controlled. As one such example, first actuator 126 and/or second actuator 128 is an electronically controlled valve (e.g., servo valve) that is configured to be selectively adjusted to regulate the flow of hydraulic fluid to driving element 124. In such examples, the electronically controlled valve may be referred to as an electrohydraulic servo valve (EHSV). In another example, first actuator 126 and/or second actuator 128 is an electronically controlled valve that is configured to be selectively adjusted to regulate the flow of a pressurized gas to driving element 124. As yet another example, first actuator 126 and/or second actuator 128 comprise an electric motor or other electro-mechanical device that is configured to generate torque when supplied with electric power.

In some examples, brakes 114 are hydraulic brakes. In such examples, one or more actuating mechanisms 122 comprise electro-hydraulic actuating mechanisms that are configured to provide braking force to wheels 20 via pressurized hydraulic fluid. As one such example, one or more actuating mechanisms 122 comprise a pressure source 132 (e.g., a pump) that is configured to pressurize hydraulic fluid and supply this higher-pressure hydraulic fluid to a hydraulic chamber 125, within which driving element 124 is situated, via first actuator 126 and/or second actuator 128. As discussed above, in such examples, first actuator 126 and second actuator 128 comprise electronically controlled valves that are configured to be selectively adjusted to regulate the flow of pressurized hydraulic fluid to hydraulic chamber 125. In particular, the electronically controlled valves are configured to regulate the flow of pressurized hydraulic fluid to the hydraulic chamber on one side of the driving element to translate the driving element. In some such examples, driving element 124 is positioned within hydraulic chamber 125 and is configured to translate relative to and/or within hydraulic chamber 125 due to changes in hydraulic pressure on either side of the driving element.

In some examples, first actuator 126 and/or second actuator 128 are configured to be selectively adjusted (e.g., opened) to increase the flow of pressurized hydraulic fluid to hydraulic chamber 125 on one side of the driving element and thereby increase the compressive force supplied to the plurality of friction plates by the driving element. Thus, when configured as hydraulic brakes, brakes 114 include pressure source 132 that pressurizes the hydraulic fluid, and an electronically controlled valve that regulates the flow of pressurized hydraulic fluid to hydraulic chamber 125 to adjust the compressive force applied to the plurality of friction plates by driving element 124.

In another example, brakes 114 are, or include, electric brakes. In such examples, one or more actuating mechanisms comprise electro-mechanical actuating mechanisms that are configured to provide a braking force to wheel 20 via torque output from an electric motor. As discussed above, in such examples, first actuator 126 and second actuator 128 comprise electric motors that are configured to translate driving element 124 relative to the plurality of friction plates to selectively increase the compressive force supplied to the plurality of friction plates by the driving element.

In some examples, each of brakes 114 includes a release mechanism 130 that is configured to reduce and/or entirely discontinue the compressive force supplied to the plurality of friction plates by the driving element. For example, when brakes 114 are configured as hydraulic brakes, release mechanism 130 comprises a valve (e.g., a pressure release valve, such as a servo valve) that is configured to reduce and/or cut off the hydraulic pressure supplied to one side of driving element 124. In some such examples, hydraulic chamber 125 includes a biasing mechanism (e.g., spring) that returns driving element 124 to an inactive position (i.e., a position where the driving element does not exert a compressive force on the plurality of friction plates). As one example, release mechanism 130 is configured to be selectively adjusted (e.g., opened) to release hydraulic fluid from hydraulic chamber 125 and/or otherwise reduce the hydraulic pressure supplied to one side of driving element 124 when the corresponding brake reaches a transition temperature and/or aircraft 10 reaches a transition velocity. In some such examples, the biasing mechanism returns the driving element to the inactive position such that the driving element 124 does not provide a compressive force to the plurality of friction plates and the brakes do not apply a braking force. In this way, release mechanism 130 may be selectively adjusted to release the brakes.

Controller 140 is programmed to selectively adjust the brakes 114 to adjust the braking force applied to wheels 20. As one example, controller 140 is programmed to selectively adjust the one or more electronically controlled components of brakes 114. As examples, controller 140 is programmed to selectively adjust one or more of first actuator 126, second actuator 128, release mechanism 130, or pressure source 132 to adjust the braking force applied to wheels 20.

In examples where brakes 114 are, or include, hydraulic brakes, controller 140 is programmed to apply the brakes and/or increase the braking force applied by brakes 114 by one or more of increasing electric power to pressure source 132 (to further pressurize the hydraulic fluid), increasing the flow of pressurized hydraulic fluid to driving element 124 (e.g., by opening one or more servo valves such as first actuator 126 and/or second actuator 128), and/or closing release mechanism 130. Conversely, controller 140 is programmed to release the brakes and/or reduce the braking force applied by brakes 114 by one or more of reducing electric power to pressure source 132, reducing the flow of pressurized hydraulic fluid to one side of driving element 124 (e.g., by closing the one or more servo valves), and/or opening release mechanism 130 to allow hydraulic fluid to escape from hydraulic chamber 125 and allow the driving element 124 to return toward the inactive position.

In examples where brakes 114 are, or include, electric brakes, controller 140 is programmed to adjust the braking force applied by the brakes by selectively adjusting the electric motors. As an example, controller 140 is programmed to increase an amount of electric power supplied to the electric motors (e.g., by increasing a pulse width of a pulse-width modulated signal) to increase the braking force applied by the brakes, and vice versa.

As used herein, the controller being "programmed" to perform various actions and/or methods means that the controller comprises stored computer-readable instructions that are executable by a processing unit of the controller to perform the various actions and/or methods. Controller 140 also may be referred to herein as computing device 140 and/or computer 140. In some examples, controller 140 includes a processing unit 142 and a memory unit 144. When included, memory unit 144 is configured to store computer-readable instructions and processing unit 142 is configured to execute the stored computer-readable instructions to perform various computing functions (e.g., selectively adjust one or more of the electronically controlled devices). For example, processing unit 142 is configured to execute the computer-readable instructions stored in memory unit 144 to adjust one or more of the components of one or more actuating mechanisms 122 to adjust the braking force applied to wheels 20 by brakes 114.

In some examples, memory unit 144 comprises non-volatile (also referred to herein as "non-transitory") memory 146 (e.g., ROM, PROM, and EPROM) and volatile (also referred to herein as "transitory") memory 148 (e.g., RAM, SRAM, and DRAM). In some examples, processing unit 142 comprises integrated circuits including one or more of field-programmable gate arrays (FPGAs), application-specific integrated circuits (ASICs), digital signal processors (DSPs), microprocessors, microcontrollers, programmable array logic (PALs), or complex programmable logic devices (CPLDs).

As will be described in greater detail below, controller 140 is programmed to execute various methods, such as the methods schematically represented in FIGS. 3-7. In some examples, memory unit 144 is configured to store computer-readable instructions for performing the methods, and processing unit 142 is configured to execute the methods responsive to various inputs (e.g., input from a user via a brake input device, and/or measurements received from various sensors).

In some examples, controller 140 is configured to adjust brakes 114 based on input received from a user 190. For example, brake system 100 optionally includes a brake input device 150 that is configured to provide an indication of an amount of braking force commanded by user 190 (e.g., captain, first officer, other pilot, etc.). Brake input device 150 includes a brake pedal 152 that is configured to receive the user input and a brake pedal position sensor 154 that is configured to measure the position of the brake pedal 152 to provide an indication of the amount of braking force commanded by the user. As an example, brake pedal 152 is configured to be selectively adjusted (e.g., pivoted and/or translated) by a foot of the user. As one such example, user 190 depresses brake pedal 152 to command for more braking force and releases brake pedal 152 to command for less braking force. In some examples, controller 140 determines the amount of braking force commanded by the user based on measurements of the position of brake pedal 152 received from brake pedal position sensor 154 and adjusts the brakes accordingly.

In some examples, controller 140 determines an amount of braking force to apply to wheels 20 (e.g., a desired braking force) based on user input received from brake pedal 152. As an example, controller 140 increases the braking force applied by brakes 114 responsive to user 190 depressing brake pedal 152 and/or decreases the braking force applied by brakes 114 responsive to user 190 releasing brake pedal 152. Additionally or alternatively, controller 140 determines an amount of braking force to apply to wheels 20 based on auto-braking and/or antiskid control logic. For example, controller 140 automatically adjusts the brakes (via the auto-braking control logic) during landing without requiring input from user 190. As another example, controller 140 independently adjusts the braking force applied by each of the brakes 114 to reduce and/or prevent wheel skidding. As just one such example, controller 140 is programmed to monitor wheel speed and adjust the brakes 114 to ensure that each of the wheels spin at substantially the same speed and/or to ensure that the wheels do not lock up (e.g., stop spinning) to enhance braking efficiency and maximize aircraft deceleration.

In yet further examples, controller 140 is programmed to determine the amount of braking force to apply to wheels 20 based on brake temperature. As just one example, and as will be described in greater detail below with reference to FIG. 3, controller 140 is configured to initially apply a warmest subset of the brakes that are available for braking at the start of a brake event, and then subsequently transition to applying a next warmest subset of the brakes if and/or when at least one of the brakes of the warmest subset of the brakes need to be released (e.g., when the at least one of the brakes reaches a transition temperature and/or the aircraft reaches a transition velocity at which the controller has determined that the at least one of the brakes will reach the transition temperature).

In some examples, controller 140 is programmed to perform various calculations and/or selectively adjust brakes 114 based on measurements received from various sensors. As an example, and as will be described in greater detail below with reference to FIG. 3, controller 140 is programmed to estimate one or more of a current temperature of each of the brakes, a current kinetic energy of aircraft 10, a current velocity of aircraft 10, changes in aircraft velocity (e.g., acceleration/deceleration), an amount of remaining brake energy available for braking for each of the brakes, or a transition velocity for each of the brakes at which each brake will reach a transition energy threshold (at which the brake may need to be released to maintain the temperature of the brake below a transition temperature) based on measurements received from one or more of a plurality of sensors 160.

Thus, in some such examples, brake system 100 includes the plurality of sensors 160. Plurality of sensors 160 includes one or more of brake temperature sensors 162 that are configured to measure a temperature of each of brakes 114, wheel speed sensors 166 (e.g., Hall effect sensors or other sensors that are suitable for measuring rotational speed) that are configured to measure a speed of each of wheels 20 (and therefore a velocity of aircraft 10 when on ground), or a brake pressure sensor 164 that is configured to measure brake pressure (e.g., hydraulic fluid pressure within hydraulic chamber 125) and thereby provide an indication of the braking force applied to wheels 20 (since pressure within hydraulic chamber 125 is directly proportional to the compressive force applied to the plurality of friction plates by driving element 124). Additionally or alternatively, the plurality of sensors include an inertial sensor 168 (and/or aircraft 10 includes the inertial sensor 168) that is configured to provide an indication of an amount of acceleration/deceleration of aircraft 10. For example, inertial sensor 168 comprises an inertial reference unit that includes one or more gyroscopes and/or accelerometers.

Figure 3A:
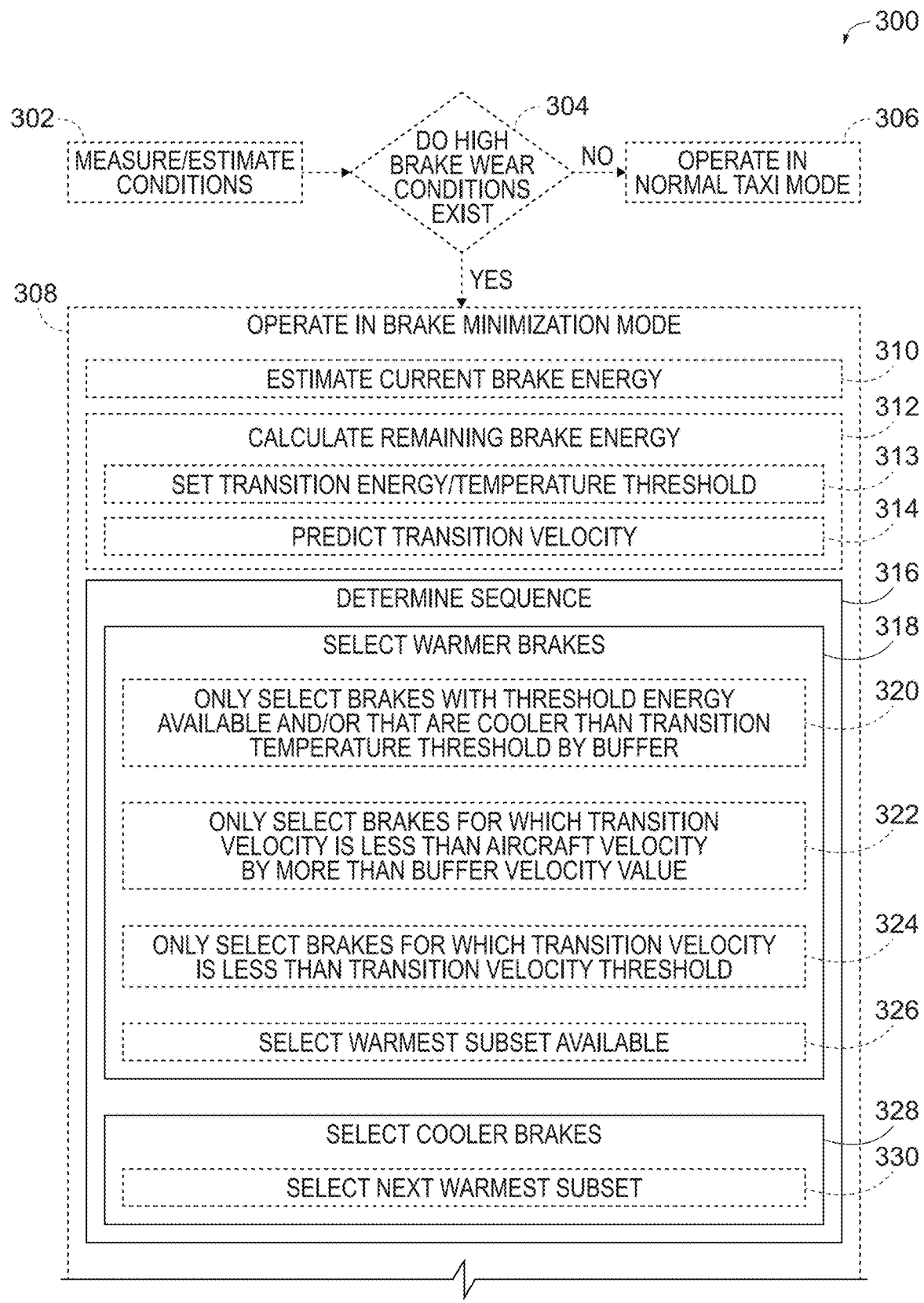
FIGS. 3A and 3B collectively are a flowchart schematically representing methods for reducing brake wear during aircraft taxiing, according to the present disclosure.
Figure 3B:
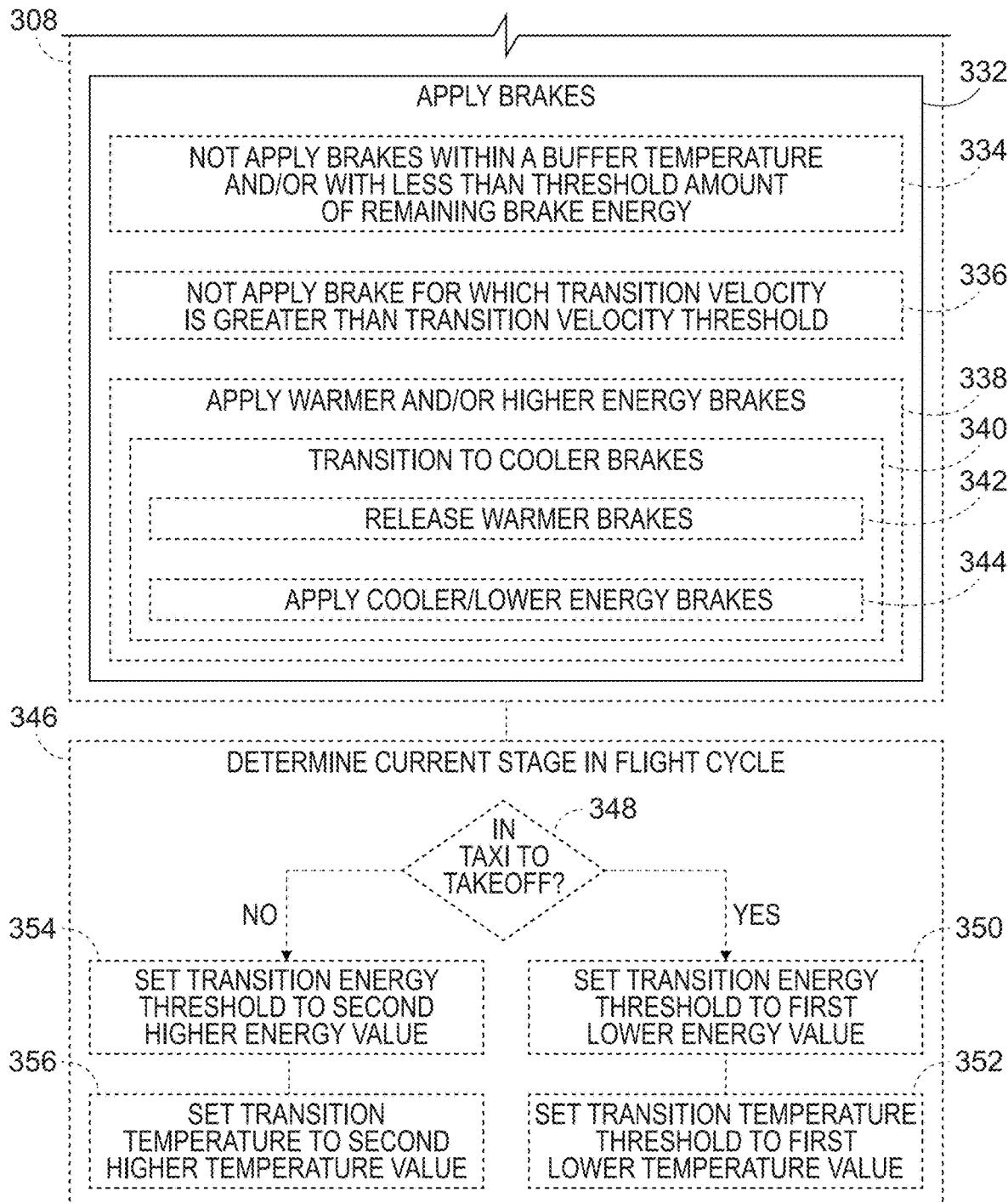

FIG. 3 schematically provides a flowchart that represents illustrative, non-exclusive examples of methods according to the present disclosure. However, although referred to herein as "FIG. 3," for convenience, the flowchart is shown in two drawings, individually captioned as FIG. 3A and FIG. 3B In FIG. 3, some steps are illustrated in dashed boxes indicating that such steps may be optional or may correspond to an optional version of methods according to the present disclosure. That said, not all of methods according to the present disclosure are required to include the steps illustrated in solid boxes. The methods and steps illustrated in FIG. 3 are not limiting and other methods and steps are within the scope of the present disclosure, including methods having greater than or fewer than the number of steps illustrated, as understood from the discussions herein.

In particular, FIG. 3 illustrates methods 300 for reducing brake wear (e.g., carbon brake wear) during aircraft taxiing. As discussed above, controller 140 may be programmed to perform one or more of methods 300. For example, controller 140 includes computer-readable instructions stored in non-transitory memory 146 for performing one or more of methods 300, with the computer-readable instructions for execution by processing unit 142 to perform one or more of methods 300. Since methods 300 are configured to be executed by controller 140 in some examples, methods 300 may be referred to herein as computer-implemented methods 300.

As an overview, methods 300 include determining, at 316, a sequence to apply brakes (e.g., brakes 114) of a given set of landing gear (e.g., left-side set of landing gear 14 and/or right-side set of landing gear 16) during a brake event based on brake temperature. Specifically, the brakes 114 selected for application are each cooler than a transition temperature, discussed below. In some examples, at least some and/or all of the determining at 316 is performed prior to the brake event. That is, the methods 300 at 316 optionally include determining the sequence to apply the brakes before the brake event begins.

The determining at 316 includes selecting, at 318, one or more warmer brakes of the brakes to initially apply at a start of the brake event, and selecting, at 328, one or more cooler brakes of the brakes to subsequently apply if and/or when the one or more warmer brakes need to be released during the brake event where continued braking force is still desired. Methods 300 further include applying, at 332, the one or more warmer brakes and the one or more cooler brakes in the determined sequence (i.e., the one or more warmer brakes before the one or more cooler brakes) during the brake event.

As an example, the selecting at 318 may include selecting, at 326, a warmest subset of the brakes that are available for braking (i.e., a warmest subset of the brakes that have at least a threshold amount of remaining brake energy available for braking). As one such example, brakes are available for braking when they are cooler than a transition temperature by more than a buffer temperature value (and thus are able to absorb at least a threshold amount of the aircraft's kinetic energy). Thus, the remaining brake energy available for braking for a given brake may be the amount of kinetic energy the brake can absorb before reaching (i.e., heating up to) the transition temperature. In some examples, a brake is only available for braking when the brake has at least a threshold amount of remaining brake energy available for braking (i.e., the current brake energy of the brake is less than a transition energy threshold by more than a buffer energy value).

As another example, the selecting at 328 may include selecting, at 330, a next warmest subset of the brakes to apply if and/or when at least one of the one or more warmer brakes needs to be released. For example, the at least one of the one or more warmer brakes optionally is released when the at least one of the one or more warmer brakes reaches the transition temperature, a velocity of an aircraft (e.g., aircraft 10) reaches a transition velocity at which the controller has predicted that at least one of the one or more warmer brakes will reach the transition temperature, and/or the at least one of the one or more warmer brakes no longer has any remaining brake energy available for braking (i.e., brake energy has reached the transition brake energy threshold).

In some examples, brake temperature is determined directly based on brake temperature measurements received from a brake temperature sensor (e.g., one or more brake temperature sensors 162). In such examples, the one or more warmer brakes may be released when the brake temperature sensor indicates that the brakes have reached the transition temperature.

In other examples, the temperature of the brakes is determined indirectly and/or inferred based on the amount of kinetic energy absorbed by the brakes during a brake event. In particular, since the brakes convert the kinetic energy of the aircraft to heat, increases in the temperature of the brakes during a brake event are directly correlated to the amount of kinetic energy absorbed by the brakes. Thus, the amount that the brakes have warmed during a brake event may be indirectly determined and/or inferred based on the amount of energy absorbed by the brakes during the brake event (i.e., which may be roughly equivalent to the amount of kinetic energy lost by the aircraft since the brakes were initially applied). The kinetic energy of the aircraft in turn is calculated based on the velocity of the aircraft and a mass of the aircraft. For example, the kinetic energy (K.E.)=½mv².

In some such examples, the methods 300 optionally include, at 314, prior to and/or at the start of the brake event, predicting the transition velocity for each brake at which the brake will reach the transition temperature, the transition energy threshold, and/or otherwise need to be released. In some examples, the predicting at 314 includes estimating the transition velocity based on a current kinetic energy of the aircraft, a mass of the aircraft, the remaining brake energy available for braking for each of the brakes, and a number of brakes to be applied during the brake event. As just one example, the predicting at 314 includes determining the amount of remaining brake energy available for the highest temperature brake of the one or more warmer brakes (i.e., the brake with the lowest amount of remaining available brake energy) based how much kinetic energy the highest temperature brake can absorb before it will reach (i.e., heat up to) the transition temperature. Herein, predicting, estimating, determining, and variations thereon (e.g., predict, predicted, estimate, estimated, determine, and determined) also may be referred to as calculating and variations thereon (e.g., calculate and calculated).

The remaining amount of brake energy available for braking may be determined based on the current energy of the brake and the transition energy threshold (e.g., the difference between these two energies). In some examples, the current energy of the brake is determined based on the latent heat of the brake and a subsequent amount of heat accumulated by the brake during recent brake events. In some such examples, the latent heat is estimated based on brake temperature measurements and a known relationship between, and/or model of, brake temperatures and brake energies. In some such examples, the accumulated heat is estimated based on an amount of kinetic energy absorbed by the brakes during recent brake events (brake events that have occurred since the brake temperature measurements that were used to calculate the latent heat were taken). The amount of kinetic energy absorbed by the brakes during the recent brake events may be determined based on the aircraft mass, changes in aircraft velocity, and a number of the brakes applied during the recent brake events.

In some examples, the remaining amount of brake energy available for braking of the highest temperature brake is multiplied by the number of brakes to be applied during the brake event to determine the total kinetic energy that may be absorbed by the one or more warmer brakes during the brake event (i.e., the brake energy capacity). The brake energy capacity of the one or more warmer brakes is subtracted from the current kinetic energy of the aircraft to estimate what the final kinetic energy of the aircraft will be when the at least one of the one or more warmer brakes reaches the transition temperature. The transition velocity of the aircraft is then calculated based on this final kinetic energy of the aircraft and the mass of the aircraft according to K.E.=½mv². Thus, in such examples, the transition velocity equals the square root of (2*(current aircraft K.E.−(remaining brake energy available for braking of highest temperature brake*number of brakes to be actuated)/aircraft mass)).

Thus, during the brake event, the velocity of the aircraft may be monitored (e.g., via wheel speed measurements received from a wheel speed sensor (e.g., one or more wheel speed sensors 166)), and when the velocity of the aircraft decreases to the transition velocity at which it is predicted that at least one of the one or more warmer brakes will reach the transition temperature, the methods 300 include, at 340, transitioning to applying the one or more cooler brakes. In this way, brakes that wear less when applied during a brake event (i.e., warmer brakes) are applied before and/or instead of brakes that are prone to wear more (i.e., cooler brakes).

In some examples, methods 300 include only selecting, at 320, brakes to be applied during a brake event that have at least a threshold amount of remaining brake energy available for braking and/or that are cooler than the transition temperature by more than a buffer temperature value.

Limiting which of the warmer brakes are available for braking in this way, reduces the total number of brakes that are applied during the brake cycle (and therefore reduces the number of brake applications during the brake cycle) by requiring that the brakes have at least a sufficient amount of remaining brake energy available for braking if they are to be applied during the brake event. In particular, restricting which of the warmer brakes are to be applied in this manner reduces transient and/or superfluous applications of brakes that are too hot to provide substantial braking during the brake event (e.g., a rejected take-off for a large commercial airplane may require more than 500 kilojoules (KJ) of brake energy), thereby reducing the total number of brakes that are applied during the brake event, and thus reducing brake wear.

As described above and schematically illustrated in FIG. 3, the aforementioned brake wear mitigation actions optionally are performed during high brake wear conditions only while operating in a brake wear minimization mode. For example, methods 300 optionally include, at 302, measuring and/or estimating aircraft and/or brake operating conditions. As examples, the estimating at 302 includes one or more of estimating a current velocity of the aircraft based on wheel speed measurements received from the wheel speed sensor, estimating a user-commanded braking force based on brake pedal position measurements received from a brake pedal position sensor (e.g., brake pedal position sensor 154), estimating brake temperature based on brake temperature measurements received from the brake temperature sensors, estimating a current braking force applied to one or more wheels (e.g., wheels 20) by the brakes based on brake pressure measurements (for hydraulic brakes) received from brake pressure sensors (e.g., one or more brake pressure sensors 164) and/or based on a command signal and/or amount of electric power supplied to a brake actuator (e.g., first actuator 126) of the brakes (for electric brakes), or estimating a current acceleration and/or deceleration of the aircraft based on changes in the estimated aircraft velocity and/or based on inertial measurements received from an inertial sensor (e.g., inertial sensor 168). Additionally or alternatively, the estimating at 302 includes determining a current stage in a flight cycle (e.g., taxi to takeoff, takeoff, initial climb, cruising, descent, landing, taxi to gate, etc.) based on current aircraft location (e.g., GPS coordinates) and/or other flight parameters (aircraft velocity, aircraft altitude, engine thrust, aircraft pitch, whether autopilot is engaged, etc.). Additionally or alternatively, the estimating at 302 includes estimating a mass of the aircraft based on fuel mass, cargo mass, passenger mass, empty aircraft mass, etc.

Methods 300 optionally include, at 304, determining whether high brake wear conditions exist. As examples, high brake wear conditions exist when one or more of the current velocity of the aircraft is within a velocity threshold range (e.g., aircraft taxiing velocities), a current temperature of at least one of the brakes is below a cold brake temperature threshold (e.g., a temperature below which the brakes are cold enough to excessively wear and/or be prone to more wear when applied), or the aircraft is in one or more threshold portions of a flight cycle (e.g., aircraft is taxiing). In some such examples, the velocity threshold range is at least 5 knots, at least 8 knots, at least 10 knots, at most 25 knots, at most 30 knots, at most 35 knots, at most 40 knots, at most 50 knots, and/or at most 60 knots. In some further such examples, the cold brake temperature threshold is in the range of 75-125° C., such as depending on the properties of the associated carbon brakes, for example, with the cold brake temperature being at most 100° C., at most 120° C., at most 140° C., and/or at most 150° C. In some further such examples, the one or more threshold portions of the flight cycle in which high brake wear conditions may exist include the taxi to takeoff portion of flight (i.e., time from when the airplane leaves the gate to when it takes off and is airborne) and the taxi after landing portion of flight once a threshold duration has elapsed since landing (e.g., at least 1 minute, at least 2 minutes, at least 3 minutes, at least 4 minutes, at least 6 minutes, at least 8 minutes), also referred to herein as the "beginning" and "end" portions of the flight cycle, respectively.

As described above, the brakes may wear more and/or excessively when they are sufficiently cold (e.g., cooler than the cold brake temperature threshold). In some examples, the brake temperature is estimated directly based on the brake temperature measurements received from the brake temperature sensor. However, as explained above, the brake temperature sensor may not reflect the actual temperatures of the brakes due to an inherent lag/delay in the brake temperature sensor. Thus, in instances where brake temperature is currently changing (e.g., brakes are cooling off after a brake event), one or more of the brakes may be cooler than the cold brake temperature threshold, but the temperature sensor may not yet have registered this current, cooler temperature of the brakes. Thus, high brake wear conditions may exist even if the temperature sensor does not indicate as such. That is, instances where high brake wear conditions may be missed when relying solely on the brake temperature measurements received from the brake temperature sensor.

Thus, the methods 300 may include determining indirectly whether at least one of the brakes is below the cold brake temperature threshold via other factors, such as the current stage in the flight cycle. As an example, the determining at 304 optionally includes determining that at least one of the brakes is below the cold brake temperature threshold (and that the high brake wear conditions exist) during the taxi to takeoff portion of the flight cycle (also referred to herein as the "beginning portion of the flight cycle") since the brakes may have been idle for a significant amount of time while the aircraft was parked. Additionally or alternatively, the determining at 304 optionally include determining that at least one of the brakes is below the cold brake temperature threshold (and that the high brake wear conditions exist) after a sufficient amount of time has passed since landing (also referred to herein as the "end portion of the flight cycle"). For example, the brakes may have had adequate time to cool off after landing once the threshold duration has elapsed.

In this way, methods 300 may more accurately determine when the high brake wear conditions exist since methods 300 may determine whether the high brake conditions exist based on additional factors beyond just the brake temperature measurements received from the brake temperature sensors. Thus, methods 300 may correctly identify that high brake wear conditions exist even when measurements from the temperature sensors indicate otherwise. As such, methods 300 may positively identify a higher percentage of instances where the high brake wear conditions exist. Stated slightly differently, methods 300 do not miss and/or fail to identify many instances where the high brake wear conditions exist.

If high brake wear conditions do not exist (e.g., aircraft recently landed and the brakes are still warmer than the cold brake temperature threshold), then methods 300 optionally include, at 306, operating in a normal taxi mode. For example, operating in the normal taxi mode at 306 may include applying the brakes according to a predetermined schedule, such as a repeating sequence (i.e., prior art taxi methodology). For example, the predetermined schedule rotates which subsets of the brakes are applied during brake events in sequential order. Once all of the subsets of the brakes have been applied, the sequence restarts from the beginning and the first subset of brakes is applied again. Thus, operating in the normal taxi mode at 320 does not include determining which of the brakes to apply during a brake event and/or determining an order to apply the brakes during the brake event based on brake temperature. Instead, the brake order is pre-set according to a repeating sequence.

However, as described above, methods 300 include operating in a brake wear minimization mode at 308 when the high brake wear conditions do exist. Operating in the brake wear minimization mode at 308 optionally includes, at 310, estimating current brake energy for each of the brakes. In some examples, the estimating at 310 includes calculating a base energy (i.e., latent heat) of each of the brakes based on brake temperature measurements that were taken by the brake temperature sensors after the brakes had not been applied (i.e., inactive) for at least a threshold soak duration. In some further such examples, the estimating at 310 includes calculating an amount of heat/thermal energy that has accumulated in the brakes since these initial brake measurements were taken (i.e., during subsequent braking events that occurred after the brake measurements were taken) based on the change in the kinetic energy of the aircraft during the recent braking events. In yet further such examples, the estimating at 310 includes estimating the current energy of the brakes based on both the base energy estimate and the accumulated heat/energy estimate. As one such example, the estimating at 310 includes calculating the total current brake energy of each of the brakes by adding the base energy estimate and the accumulated heat/energy estimate.

As one example, the estimating at 310 includes estimating the latent heat of the brakes based on the brake temperature measurements received from the brake temperature sensors. For example, the estimating at 310 may include estimating the latent heat based on a known relationship between brake temperature measurements and brake energy (e.g., a look-up table). Thus, the estimating at 310 optionally includes converting the brake temperature measurement to a corresponding brake energy value via the known relationship. In some examples, the estimating at 310 is based only on brake temperature measurements that were taken after the threshold soak duration elapsed since the brakes were last applied. Thus, the threshold soak duration is a duration during which the brakes were not applied (i.e., brakes were inactive). In some examples, the threshold soak duration comprises a period of inactivity of at least 6 minutes, at least 7 minutes, and/or at least 8 minutes. Thus, in some such examples, the estimating at 310 includes estimating the base energy (latent heat) of a given brake based only on brake temperature measurements of the given brake that were taken after the given brake had not been applied for at least the threshold soak duration.

Additionally or alternatively, the estimating at 310 includes estimating recent change in the energy of brakes by accounting for the energy absorbed by the brakes during recent braking events. As described above, the brakes heat up when applied, and thus in some examples, the estimating at 310 include estimating the amount of brake energy accumulated by each of the brakes recent applications of the brakes (i.e., brake events that have occurred since the initial temperature measurements were taken that were used to estimate the latent heat of the brakes). For example, the estimating at 310 may include estimating the accumulated heat/energy of the brakes based on brake events that occurred within a threshold preceding duration (e.g., within the last 1 minute, 2 minutes, 3 minutes, 4 minutes, 5 minutes, 6 minutes, 7 minutes, and/or 8 minutes). In some such examples, the estimating at 310 includes estimating the current brake energy for each brake based on the amount of energy absorbed by each brake during the recent brake event(s) (e.g., how long and/or hard the brakes were applied).

As described above, the amount of kinetic energy absorbed by the brakes during the recent brake event(s) may be estimated based on the number of brakes applied during the brake event, and the total change in the kinetic energy of the aircraft during the brake event. The change in the kinetic energy of the aircraft, as described above, in turn may be estimated based on aircraft deceleration and/or changes in aircraft velocity, which may be determined based on wheel speed measurements received from the wheel speed sensors and/or inertial measurements received from the inertial sensor. As examples, the inertial sensor may provide an indication of the instantaneous acceleration/deceleration of the aircraft, while the wheel speed measurements may provide a record of the aircraft velocity showing past/historical changes in the aircraft velocity.

Thus, the estimating at 310 may include estimating the accumulated energy (i.e., the energy that has been absorbed by the brakes during recent brake events) based on changes in the kinetic energy of the aircraft during recent brake events. In this way, energy absorbed by the brakes during recent brake events (energy which may not be registered by the brake temperature sensors because of the delay/lag associated with the brake temperature sensors), may nonetheless be accounted for when estimating the current brake energy. Stated slightly differently, estimating the current brake energy based on recent braking events accounts for the heat that has accumulated in the brakes since a most recent accurate brake temperature measurement (measurement taken after the threshold soak duration has elapsed since the brakes were last applied).

In some examples, the estimating at 310 includes estimating the current brake energy based on ambient temperatures and/or an amount of time that has elapsed since the recent brake event(s). In particular, although the brakes may heat up when applied during the recent brake events, they also cool down after they are released, especially at lower ambient temperatures. Thus, in some examples, brake energy is modeled as a function of the base energy, the kinetic energy absorbed by the brakes during the recent brake events, the duration since these recent braking events occurred, and/or the ambient temperature. In this way, both thermal energy (heat) gained and lost by the brakes since the brakes were at their base energy level may be modeled/predicted to provide a more accurate estimate of the current brake temperature.

In some examples, the current brake energy estimated at 310 is used to calculate the amount of remaining brake energy available for braking for each of the brakes. For example, methods 300 may include, at 312, calculating the remaining available brake energy for each of the brakes based on the current brake energy and a transition energy threshold. As one such example, the calculating at 312 includes subtracting the current brake energy from the transition energy threshold to determine the remaining brake energy available for braking. Stated slightly different, the remaining brake energy available for braking is the amount of energy the brakes can absorb before they reach the transition energy threshold. In other examples, calculating at 312 includes calculating the remaining available brake energy for each of the brakes based on the current brake temperature and the transition temperature.

In some examples, the transition energy threshold and/or the transition temperature is/are preset. In some such examples, the transition energy threshold is at least 2,000 KJ, at least 2,200 KJ, at least 2,400 KJ, at most 2,500 KJ, at most 2,700 KJ, and/or at most 2,900 KJ. In some such examples, the transition temperature is 300-400° C., at least 300° C., at least 350° C., at least 370° C., at least 390° C., at most 450° C., at most 430° C., at most 400° C., at most 380° C., and/or at most 350° C. However, in other examples, the calculating at 312 includes, at 313, setting the transition energy threshold and/or the transition temperature based on the current stage in the flight cycle. As an example, the transition energy threshold and/or the transition temperature is/are set to a lower energy and/or temperature value prior to takeoff than after landing to ensure that the brakes have sufficient thermal capacity to execute a rejected takeoff without overheating.

In particular, methods 300 optionally include, at 346, determining the current stage in the flight cycle. As described above, this may be determined based on GPS location and/or flight parameters. In some examples, methods 300 include, at 348, determining whether the aircraft is currently in the taxi to takeoff stage in the flight cycle (also referred to herein as "the beginning portion of the flight cycle"). If the aircraft is in taxi to takeoff, then methods 300 optionally include, at 350, setting the transition energy threshold to a first lower energy value and/or, at 352, setting the transition temperature to a first lower temperature value. Conversely, if the aircraft is not in taxi to takeoff, then methods 300 optionally include, at 354, setting the transition energy threshold to a second higher energy value and/or, at 356, setting the transition temperature to a second higher temperature value. In some examples, the first lower energy value is at least 1,500 KJ and at most 2,200 KJ and the second higher energy value is at least 2,000 KJ and at most 2,700 KJ. In some examples, the first lower temperature value is at least 300° C. and at most 400° C., and the second higher temperature value is at least 370° C. and at most 500° C.

Once the transition energy threshold is set, the remaining amount of brake energy available for braking may be determined based on the difference between the current energy of the brakes and the transition energy threshold (i.e., how much energy the brakes have left before they reach the transition energy threshold). Based on this remaining amount of available brake energy, the aircraft transition velocity at which the brakes will run out of available brake energy (i.e., when the brakes reach the transition energy threshold) may be determined.

In particular, in some examples, methods 300 include, at 314, predicting the transition velocities at which each of the brakes will reach the transition energy threshold based on the remaining brake energy available for braking of each brake. In one such example, the predicting at 314 includes predicting the transition velocity of the highest energy brake(s) of the one or more warmer brakes (i.e., the brake of the one or more warmer brakes that has the least amount of remaining brake energy available for braking) since this is the brake that is most likely to reach the transition energy threshold first during the brake event. The predicting at 314 optionally includes predicting the transition velocity for each of the brakes based on one or more of the current kinetic energy of the aircraft, the aircraft mass, the number of brakes to be applied during the brake event, and the remaining brake energy available for each of the brakes, as described above. As one such example, the remaining brake energy available for the highest energy brake(s) is multiplied by the number of the brakes to be applied simultaneously during the brake event (e.g., the number of the one or more warmer brakes to be applied at the start of the brake event) to determine how much energy the brakes may absorb (and therefore how much kinetic energy the aircraft will lose) before the highest energy brake reaches the transition energy threshold. The transition velocity is calculated based on the aircraft's predicted kinetic energy at the time the highest energy brake reaches the transition energy threshold (i.e., current aircraft kinetic energy−(remaining brake energy available for braking of highest energy brake)*(number of brakes to be applied simultaneously at the start of the brake event)).

As described above, methods 300 include, at 316, determining the sequence to apply the brakes during the brake event based on brake temperature and/or brake energy. In some examples, the determining at 316 is performed prior to and/or at the start of the brake event. Then, during the brake event, methods 300 include, at 332, applying the brakes in the sequence determined at 316 (e.g., warmer brakes before cooler brakes). The applying at 332 is described in greater detail below.

In particular, the determining at 316 includes, at 318, selecting the one or more of the warmer brakes of the brakes to initially apply at the start of the brake event. As mentioned above, the selecting at 318 optionally includes, at 326, selecting a warmest subset of the brakes that are available for braking. The brakes that are available for braking may include only those brakes that have at least a threshold amount of remaining brake energy available for braking and/or that are cooler than the transition temperature by more than a buffer temperature value. Thus, the selecting at 318, optionally includes, at 320, only selecting the brakes that have at least the threshold amount of remaining brake energy available for braking and/or that are cooler than the transition temperature by more than the buffer temperature value. In some examples, the threshold amount of remaining brake energy available for braking is at least 500 KJ, at least 600 KJ, at least 700 KJ, at least 750 KJ, and/or at least 800 KJ. Thus, the threshold amount of remaining brake energy available for braking is effectively a buffer energy value—it represents the amount of energy the brakes must be below the transition energy threshold in order to be available for braking and/or to be selected for braking at 320. As such, the threshold amount of remaining brake energy available for braking is also referred to herein as the buffer energy value.

In some examples, the buffer temperature value is 50-100° C., at least 50° C., at least 100° C., at least 150° C., at least 200° C., at most 200° C., at most 150° C., and/or at most 100° C.

In some examples, the selecting at 318 includes, at 322, only selecting brakes for which the transition velocity is less than the current aircraft velocity by more than a buffer velocity value. As example, the buffer velocity value is at least 3 knots, at least 5 knots, at least 7 knots, and/or at least 9 knots.

In some examples, one or more of the above values (e.g., the buffer energy value, the buffer temperature value, and/or the buffer velocity value) is/are preset. However, in other examples, one or more of the buffer values is/are set and/or adjusted based on one or more aircraft operating parameters. As one example, the one or more of the buffer values is/are set based on the predicted amount of deceleration and/or kinetic energy less than will be commanded (e.g., by a user) during the brake event. For example, the buffer values are set to higher values when a greater amount of deceleration and/or kinetic energy loss is predicted to be desired and/or occur during the brake event, and vice versa. In this way, the brakes that are selected for braking during the upcoming brake cycle may be specifically tuned based on the amount of brake energy that is predicted to be required during the brake event.

As examples, brakes are selected and/or applied based on the predicted duration and extent of the brake event (how much brake energy the brake event will demand). In some such examples, when the brake event is predicted to command greater decelerations and/or kinetic energy losses, lower energy brakes (brakes that are cooler and/or have more braking capacity) may be selected to be initially applied at the start of the brake event as compared to brake events that are predicted to command smaller deceleration and/or kinetic energy losses. Such selection may reduce the number of brakes that are applied during the brake event and therefore further reduce brake degradation.

In some examples, the predicted deceleration and/or kinetic energy loss (e.g., energy absorbed by the brakes) to be demanded during the brake event is determined based on one or more of the current velocity of the aircraft, the engine idle thrust, an average taxi velocity of the aircraft, historical taxi data of the aircraft, a current location of the aircraft, locations of nearby aircraft, predicted turning and/or cornering events based on, for example, the runway layout and current location of the aircraft, and air traffic control information. As just one example, when braking is commanded when the current velocity of the aircraft is above an average taxi speed (e.g., 20 knots), the deceleration of the brake event is predicted to be less than when the aircraft is at or below the average taxi speed. This is not least because when above the average historical taxi speed of the aircraft, the user is more likely intending to slow the aircraft down just enough to get it near and/or closer to the average taxi speed (a minimal deceleration), whereas the user is more likely to be intending a more significant slowdown when the aircraft is already at, near, or below the taxi speed because the user is more likely intending to stop the aircraft to wait for other aircraft to pass, to turn a corner, and/or to enter a gate approach crawl speed (e.g., 5 knots) when nearing the gate).

As described above, by limiting which of the brakes are available for braking during an upcoming brake event in the aforementioned manner(s) and/or by limiting which of the one or more warmer brakes are selected for braking during the brake event in the aforementioned manner(s), fewer of the brakes may be applied during the upcoming brake event, thereby reducing brake wear, particularly for carbon brakes.

In some examples, the selecting at 318 includes, at 324, only selecting brakes for which the transition velocity is less than a transition velocity threshold. As examples, the transition velocity threshold is at least 5 knots, at least 7 knots, at least 8 knots, at least 9 knots, at least 10 knots, at most 15 knots, at most 13 most knots, at most 11 knots, and/or at most 10 knots. Thus, brakes that will reach the transition energy threshold and/or transition temperature (and thereby necessitate a transition to the one or more cooler brakes) at a sufficiently high transition velocity (i.e., a velocity greater than the transition velocity threshold), are unavailable for braking during the brake event and/or are otherwise not selected for braking during the brake event. This may reduce the chance that brake transitions occur at higher speeds.

The determining at 316 further includes, at 328, selecting the one or more cooler brakes of the brakes to subsequently apply if the brake event requires more energy than the one or more warmer brakes can provide. For example, the selecting at 328 includes selecting one or more cooler brakes to subsequently apply if and/or when at least one of the one or more warmer brakes reaches the transition energy threshold and/or the transition temperature during the brake event. In some examples, the selecting at 328 includes selecting, at 330, a next warmest subset of the brakes to apply. For example, of the brakes that are cooler than the one or more warmer brakes (i.e., the brakes that are selected to be initially applied at the start of the brake event), the selecting at 330 includes selecting the warmest subset of the remaining, cooler brakes. In this way, the next warmest brakes that are available for braking are applied if and/or when the one or more warmer brakes run out of brake energy and braking is still desired (the brake event is not over). Thus, the brake sequence is temperature-dependent, with the warmest subset of the brakes that are available for braking (i.e., are below the transition energy threshold by more than the buffer energy value and/or are below the transition temperature by more than the buffer temperature value) being selected for braking first, the next warmest subset being selected second, and so on and so forth in order of decreasing brake temperature.

When the brake event begins, methods 300 include, at 332 applying the one or more of the warmer brakes before applying the one or more cooler brakes. As an example, the applying at 332 may include, initially applying the one or more warmer brakes at the start of the brake event, for example, applying the highest energy subset and/or the highest temperature subset of the brakes that are available for braking (e.g., the highest temperature and/or highest energy subset of the brakes that are below the transition temperature by more than the buffer temperature value and/or below the transition energy threshold by more than the buffer energy value, respectively).

In some examples, the applying at 332 includes, at 340, transitioning to applying the one or more cooler brakes when the one or more warmer brakes are no longer available to provide braking force. As an example, the transitioning at 340 may include, at 342, releasing at least one of the one or more warmer brakes when the at least one of the one or more warmer brakes reaches the transition energy threshold and/or the transition temperature, and/or the velocity of the aircraft reaches the transition velocity. In some examples, the velocity of the aircraft is continually monitored during the brake event, and when the velocity reaches the transition velocity of at least one of the one or more warmer brakes, the at least one of the one or more warmer brakes is/are released. As discussed above, the velocity of the aircraft may be monitored based on the wheel speed measurements.

In some examples, the releasing at 342 includes releasing only those brakes of the one or more brakes that have reached the transition energy threshold and/or the transition temperature. In some examples, the one or more warmer brakes are not all the same energy and/or temperature and the warmer brakes reach the transition energy threshold and/or transition temperature at different times (i.e., some reach the transition energy threshold and/or transition temperature before others). Thus, the releasing at 342 includes, in some examples, independently releasing each of the one or more warmer brakes according to when each of the one or more warmer brakes reaches the transition energy threshold and/or the transition temperature.

When releasing the one or more warmer brakes at 342, methods 300 optionally also include, applying the one or more cooler brakes (selected at 328) at 344. In some examples, the applying at 344 includes applying the next warmest subset of the brakes (selected at 326) that are available for braking. In some examples, the applying at 344 includes applying the same number of cooler brakes as the number of warmer brakes that are released at 342. Thus, for every warmer brake that is released, exactly one cooler brake is applied.

In some such examples, the transitioning at 340 includes gradually transitioning to the one or more cooler brakes.

That is, in examples where not all of the one or more warmer brakes are released at the same time, the one or more cooler brakes are not applied at the same time. In particular, in some such examples, only one of the one or more cooler brakes is applied for each one of the one or more warmer brakes that is released. In some such examples, one of the cooler brakes is applied every time one of the warmer brakes reaches the transition energy threshold and/or transition temperature and is released, regardless of whether the other warmer brakes have been or are ready to be released (have reached the transition threshold(s)). In some such examples, as soon as one of the one or more warmer brakes is released, one of the one or more cooler brakes is applied to ensure that the desired amount of braking force is applied.

The applying at 332 optionally includes, at 334, not applying brakes that are within the buffer temperature value of the transition temperature and/or that have less than the threshold amount of remaining brake energy available for braking. In some such examples, a brake is not applied when the current aircraft velocity is within the buffer velocity value of the transition velocity for that brake. In some examples, the applying at 332 includes, at 336, not applying a brake for which the transition velocity is greater than the transition velocity threshold.

Illustrative, non-exclusive examples of inventive subject matter according to the present disclosure are described in the following enumerated paragraphs:

A. A method (300) for reducing brake wear during taxiing of an aircraft (10), the method (300) comprising:
determining (316) a sequence to apply brakes (114) of a given set of landing gear (12) that are each cooler than a transition temperature during a brake event, wherein the determining (316) includes: selecting (318) one or more warmer brakes of the brakes (114) to initially apply at a start of the brake event, and selecting (328) one or more cooler brakes of the brakes (114) to subsequently apply when the warmer brake is released during the brake event; and applying (332) the one or more warmer brakes and the one or more cooler brakes in the determined sequence.

A1. The method (300) of paragraph A, wherein the applying (332) the one or more warmer brakes and the one or more cooler brakes in the determined sequence comprises initially applying a warmest subset of the brakes (114) of the given set of landing gear (12) that are cooler than a transition temperature by more than a buffer temperature value and/or initially applying a highest energy subset of the brakes (114) of the given set of landing gear (12) that are lower in energy than a transition energy threshold by more than a buffer energy value.

A2. The method (300) of paragraph A1, further comprising setting (313) the transition temperature and/or transition energy threshold based on a current stage in a flight cycle.

A3. The method (300) of paragraph A2, wherein the setting (313) the transition temperature and/or the transition energy threshold comprises setting the transition temperature to a lower temperature and/or the transition energy threshold to a lower energy when taxiing to takeoff than when taxiing after landing.

A4. The method (300) of paragraph of any of paragraphs A1-A3, wherein the applying (332) the one or more warmer brakes and the one or more cooler brakes in the determined sequence comprises initially applying (338) the one or more of the warmer brakes at the start of the brake event, and releasing (342) at least one of the one or more warmer brakes when one or more of:
a temperature of the at least one of the one or more warmer brakes reaches a/the transition temperature;
an energy of the at least one of the one or more warmer brakes reaches a/the transition energy threshold; or an aircraft velocity reaches a transition velocity of the at least one of the one or more warmer brakes.

A5. The method (300) of paragraph A4, wherein the applying (332) the one or more warmer brakes and the one or more cooler brakes in the determined sequence further comprises applying (344) the one or more cooler brakes when releasing (342) the one or more warmer brakes.

A6. The method (300) of any of paragraphs A1-A5, wherein the applying (344) the one or more cooler brakes comprises applying a next warmest subset of the brakes (114) and/or a next highest energy subset of the brakes (114) of the given landing gear (12).

A7. The method (300) of any of paragraphs A-A6, further comprising estimating (310) a current brake energy for each of the brakes (114) based on one or more of a latent heat estimate or an accumulated heat estimate.

A8. The method (300) of paragraph A7, wherein the estimating (310) comprises estimating the latent heat estimate based on brake temperature measurements and estimating the accumulated heat estimate based on an amount of kinetic energy absorbed by the brakes (114) during recent brake events.

A9. The method (300) of any of paragraphs A7-A8, further comprising calculating a current aircraft kinetic energy based on current aircraft velocity and aircraft mass.

A10. The method (300) of any of paragraphs A7-A9, further comprising calculating the current brake energy for each of the brakes and/or the current aircraft kinetic energy prior to the determining (316) the sequence to apply the brakes (114).

A11. The method (300) of any of paragraphs A9-A10, further comprising, for each of the brakes (114), predicting (314) a transition velocity for each of the brakes based on one or more of the current aircraft kinetic energy, the aircraft mass, or a number of the brakes to be applied simultaneously during the brake event, wherein the transition velocity of a given brake is an aircraft velocity at which an energy of said brake will exceed a/the brake energy threshold.

A12. The method (300) of paragraph A11, wherein the applying (332) the one or more warmer brakes and the one or more cooler brakes in the determined sequence comprises applying (338) a/the highest energy subset of the brakes for which the transition aircraft velocity is less than the current aircraft velocity by more than a buffer velocity value and/or for which the transition velocity is less than a transition velocity threshold.

A13. The method (300) of any of paragraphs A-A12, wherein the applying (332) the one or more warmer brakes and the one or more cooler brakes in the determined sequence is only performed when operating in a brake wear minimization mode, and wherein the method (300) further comprises applying the brakes in a different manner in a normal taxi mode.

A14. The method (300) of paragraph A13, wherein the method (300) further comprises operating (308) in the brake wear minimization mode when high brake wear conditions exist, and operating (306) in the normal taxi mode when the high brake wear conditions do not exist.

A15. The method (300) of paragraph A14, wherein the high brake wear conditions exist when one or more of a current aircraft velocity is within an aircraft velocity threshold range, a current brake temperature of at least one of the brakes (114) is/are below a cold brake temperature threshold, or the aircraft (10) is in one or more threshold portions of a flight cycle.

A16. The method (300) of paragraph A15, wherein the aircraft velocity threshold range comprises velocities between 8 knots and 40 knots.

A17. The method (300) of any of paragraphs A15-A16, wherein the brake temperature threshold range comprises temperatures below 120° C.

A18. The method (300) of any of paragraphs A15-A17, wherein the threshold portions of the flight cycle comprise a beginning portion of a flight cycle prior to takeoff, and an end portion of a flight cycle that occurs after a threshold duration has passed since landing.

A19. The method (300) of any of paragraphs A14-A18, wherein the operating (306) in the normal taxi mode comprises applying the brakes (114) according to a predetermined schedule.

A20. The method (300) of paragraph A19, wherein the applying the brakes according to the predetermined schedule comprises applying the brakes (114) in a repeating order.

A21. The method (300) of any of paragraphs A-A20, wherein the determining (316) the sequence to apply the brakes (114) during the brake event is further based on one or more of a current energy of each of the brakes, a predicted total brake energy demand of the brake event, or a number of brakes to be applied simultaneously during the brake event.

A22. The method (300) of paragraph A21, where the predicted total brake energy demand of the brake event is determined based on one or more of a current velocity of the aircraft (10), an average taxi velocity of the aircraft (10), historical taxi data of the aircraft (10), a current location of the aircraft (10), locations of nearby aircraft, air traffic control information, or predicted turning and/or cornering events based on runway layout and/or the current location of the aircraft (10).

A23. The method (300) of any of paragraphs A-A22, wherein the method (300) is a computer-implemented method (300) that is configured to be executed by a controller (140).

B. An aircraft brake system (100) comprising:
brakes (114); and
a controller (140) that is programmed to:
apply a warmer subset of the brakes (114) before applying a cooler subset of the brakes (114) when a braking force becomes desired during taxiing.

B1. The aircraft brake system (100) of any of paragraphs B-B1, wherein each of the brakes (114) comprises friction plates (116) and one or more actuating mechanisms (122) that are configured to selectively adjust a braking force applied by the friction plates (116).

B2. The aircraft brake system (100) of paragraph B1, wherein the controller (140) further is programmed to apply the brakes (114) by commanding the one or more actuating mechanisms (122) to increase the braking force applied by the friction plates (116).

B3. The aircraft brake system (100) of any of paragraphs B-B2, further comprising a brake input device (150), wherein the brake input device (150) comprises a brake pedal (152) and a brake pedal position sensor (154) that is configured to measure a position of the brake pedal (152).

B4. The aircraft brake system (100) of paragraph B3, wherein the controller (140) further is programmed to determine when braking force becomes desired during taxiing based on the brake pedal position measured by the brake pedal position sensor (154).

B5. The aircraft brake system (100) of any of paragraphs B-B5, further comprising one or more sensors (160) that are in electrical communication with the controller (140) and are configured to measure aircraft operating conditions and/or brake operating conditions.

B6. The aircraft brake system (100) of paragraph B5, wherein the one or more sensors (160) comprise a brake temperature sensor (162) that is configured to measure a temperature of at least one of the brakes (114), a brake pressure sensor (164) that is configured to provide an indication of a braking force applied by at least one of the brakes (114), a wheel speed sensor (166) that is configured to measure a speed of at least one wheel (20), and an inertial sensor (168) that is configured to provide an indication of aircraft acceleration and/or deceleration.

B7. The aircraft brake system (100) of paragraph B6, wherein the controller (140) further is programmed to estimate a current brake energy for each of the brakes (114) based on one or more of the temperature measurements received from the brake temperature sensor (162), the indication of the applied braking force received from the brake pressure sensor (164), the wheel speed measurement received from the wheel speed sensor (166), or the indication of the aircraft deceleration received from the inertial sensor (168).

B8. The aircraft brake system (100) of paragraph B7, wherein the controller (140) further is programmed to:
estimate the current brake energy for each of the brakes (114) by adding a latent heat estimate and an accumulated heat estimate;
calculate the latent heat estimate by converting a temperature measurement to an energy value via a known relationship between brake temperature measurements and brake energies; and
calculate the accumulated heat estimate based on instances of aircraft deceleration during taxiing and based on which of the brakes (114) were applied during said instances of aircraft deceleration and/or for how long they were applied during said instances of aircraft deceleration.

B9. The aircraft brake system (100) of any of paragraphs B7-B8, wherein the controller (140) further is programmed to calculate a current aircraft kinetic energy based on aircraft mass and aircraft velocity.

B10. The aircraft brake system (100) of paragraph B9, wherein the controller (140) further is programmed to calculate the aircraft velocity based on one or more of the wheel speed measurements received from the wheel speed sensor (166), a speed of external airflow relative to the aircraft brake system (100) provided by an airflow sensor, the indication of the aircraft acceleration and deceleration received from the inertial sensor (168), and/or position location information provided by GPS or other external location positioning systems.

B11. The aircraft brake system (100) of any of paragraphs B9-1310, wherein the controller (140) further is programmed to predict a transition velocity for each of the brakes (114) at which a future energy of each brake reaches a brake energy threshold based on one or more of a number of the brakes (114) to be applied during the brake event, the current brake energy of each of the brakes (114), the current aircraft kinetic energy, or aircraft mass.

B12. The aircraft brake system (100) of any of paragraphs B-B11, wherein the controller (140) further is programmed to:
prior to a brake event:
determine an initial subset of the brakes (114) to apply and/or an order to apply different subsets of the brakes (114) during the brake event based on one or more of a/the current brake energy for each of the brakes (114), a/the brake energy threshold, a predicted amount of deceleration to be desired during the brake event, a predicted amount of braking energy to be desired during the brake event, current aircraft velocity, a final velocity of an aircraft (10) at the end of the brake event, aircraft mass, or a number of the brakes (114) to apply during the brake event.

B13. The aircraft brake system (100) of paragraph B12, wherein the initial subset of the brakes (114) to apply comprises the warmer subset of the brakes (114) and wherein the order to apply the different subsets of the brakes (114) comprises applying the warmer subset of the brakes (114) before applying the cooler subset of the brakes (114).

B14. The aircraft brake system (100) of any of paragraphs B1-B13, wherein the brakes (114) are hydraulic brakes, and wherein the aircraft brake system (100) further comprises a pressure source (132) that is configured to supply hydraulic pressure to the one or more actuating mechanisms (122).

B15. The aircraft brake system (100) of any of paragraphs B1-B13, wherein the brakes (114) are electric brakes.

B16. The aircraft brake system (100) of any of paragraphs B-B15, wherein the brakes (114) are carbon brakes.

B17. The aircraft brake system (100) of paragraph B16 when depending from any of paragraphs B1-B2, wherein the friction plates (116) are carbon friction plates.

B18. The aircraft brake system (100) of any of paragraphs B-B17, wherein the controller (140) further is configured to perform the methods of any of paragraphs A-A21.

C. An aircraft (10) comprising the aircraft brake system (100) of any of paragraphs B-B17.

C1. The aircraft (10) of paragraph C, further comprising landing gear (12).

C2. The aircraft (10) of paragraph C1, wherein the landing gear (12) comprises one or more of a left-side set of landing gear (14), a right-side set of landing gear (16), or a nose set of landing gear (18).

C3. The aircraft (10) of paragraph C2, wherein the left-side set of landing gear (14) comprises two or more of the brakes (114), and wherein the right-side set of landing gear (16) comprises two or more of the brakes (114).

C4. The aircraft (10) of any of paragraphs C-C3, further comprising wheels (20).

C5. The aircraft (10) of paragraph C4, wherein the brakes (114) are configured to provide braking force to at least some of the wheels (20).

C6. The aircraft (10) of paragraph C5 when depending from paragraph C3, wherein the left-side set of landing gear (14) and the right-side set of landing gear (16) each comprise two or more of the wheels (20), and wherein the two or more of the brakes (114) of the left-side set of landing gear (14) are configured to provide braking force to the two or more of the wheels (20) of the left-side set of landing gear (14), and wherein the two or more of the brakes (114) of the right-side set of landing gear (16) are configured to provide braking force to the two or more of the wheels (20) of the right-side set of landing gear (16).

D. A computer-implemented method (300) for reducing brake wear during taxiing of an aircraft (10), the computer-implemented method (300) comprising:
   determining (316) a sequence to apply brakes (114) of a given set of landing gear (12) during a brake event, wherein the determining (416) includes:
      selecting (318) a warmer brake of the brakes (114) to initially apply at a start of the brake event, and
      selecting (328) a cooler brake of the brakes (114) to subsequently apply when the warmer brake is released during the brake event; and
   applying (332) the warmer brake and the cooler brake in the determined sequence.

D1. The computer-implemented method (300) of paragraph D, wherein the applying (332) the warmer brake and the cooler brake in the determined sequence comprises initially applying (338) the warmer brake at the start of the brake event, and then subsequently applying (344) the cooler brake when releasing the warmer brake.

D2. The computer-implemented method (300) of any of paragraphs D-D1, further comprising releasing (342) the warmer brake when one or more of a temperature of the warmer brakes reaches and/or increases above a transition temperature and/or an energy of the warmer brake reaches and/or increases above a transition energy threshold.

D3. The computer-implemented method (300) of any of paragraphs D-D2, further comprising releasing (342) the one or more warmer brakes when a velocity of the aircraft (10) reaches a transition velocity.

D4. The computer-implemented method (300) of paragraph D3, further comprising predicting (314) the transition velocity based on one or more of a current kinetic energy of the aircraft (10), a current energy of the warmer brake, or a number of the brakes (114) to be applied simultaneously with the warmer brake.

D5. The computer-implemented method (300) of any of paragraphs D-D4, further comprising releasing (342) the warmer brake when a velocity of the aircraft (10) reaches and/or decreases below a/the transition velocity.

D6. The computer-implemented method (300) of any of paragraphs D-D5, further comprising predicting (314) a/the transition velocity based on one or more of a current kinetic energy of the aircraft (10), a current energy of the warmer brake, or a number of the brakes (114) to be applied simultaneously with the warmer brake.

D7. The computer-implemented method (300) of paragraph D6, wherein the selecting (318) the warmer brake comprises only selecting (322) brakes (114) for which the transition velocity is less than the current aircraft velocity by more than a buffer velocity value.

D8. The computer-implemented method (300) of any of paragraphs D5-D6, wherein the selecting (318) the warmer brake comprises only selecting (324) brakes (114) for which the transition velocity is less than a transition velocity threshold.

D9. The computer-implemented method (300) of any of paragraphs D-D8, further comprising estimating (310) a/the current brake energy for each of the brakes (114) based on one or more of a latent heat estimate or an accumulated heat estimate.

D10. The computer-implemented method (300) of paragraph D9, wherein the estimating (310) comprises estimating the latent heat estimate based on brake temperature measurements and estimating the accumulated heat estimate based on an amount of kinetic energy absorbed by the brakes (114) during recent brake events.

D11. The computer-implemented method (300) of any of paragraphs D-D10, wherein the selecting (318) the warmer brake comprises selecting a warmest subset of the brakes (114) of the given set of landing gear (12) that are cooler than a transition temperature by more than a buffer temperature value.

D12. The computer-implemented method (300) of paragraph D11, wherein the selecting (328) the cooler brake comprises selecting (330) a next warmest subset of the brakes (114).

D13. The computer-implemented method (300) of any of paragraphs D-D12, wherein the selecting (318) the warmer brake comprises selecting a highest energy subset of the brakes (114) of the given set of landing gear (12) that are lower in energy than a transition energy threshold by more than a buffer energy value.

D14. The computer-implemented method (300) of paragraph D13, further comprising setting the transition energy threshold to a lower energy value when taxiing to takeoff than when taxiing after landing.

D15. The computer-implemented method (300) of any of paragraphs D-D14, wherein the applying (332) the warmer brake and the cooler brake in the determined sequence is only performed when operating in a brake wear minimization mode, and wherein the computer-implemented method (300) further comprises applying (306) the brakes in a predetermined repeating order in a normal taxi mode.

D16. The computer-implemented method (300) of paragraph D15, wherein the computer-implemented method (300) further comprises:
  operating (308) in the brake wear minimization mode when one or more of:
  a current aircraft velocity is within an aircraft velocity threshold range;
  a temperature of at least one of the brakes (114) is below a cold brake temperature threshold; or the aircraft (10) is in one or more threshold portions of a flight cycle; and operating (306) in the normal taxi mode when not operating (308) in the brake wear minimization mode.

D17. The computer-implemented method (300) of paragraph D16, wherein the aircraft velocity threshold range comprises velocities between 8 knots and 40 knots, the brake temperature threshold range comprises temperatures below 120° C., and the threshold portions of the flight cycle comprise a beginning portion of a flight cycle prior to takeoff, and an end portion of a flight cycle that occurs after a threshold duration has passed since landing.

D18. The computer-implemented method (300) of any of paragraphs D-D17, wherein the selecting (318) the warmer brake comprises selecting the warmer brake based a current energy of each of the brakes (114), and/or a predicted energy demand of the brake event.

D19. The computer-implemented method (300) of paragraph D18, further comprising estimating the predicted energy demand of the brake event based on one or more of a current velocity of the aircraft (10), an average taxi velocity of the aircraft (10), historical taxi data of the aircraft (10), a current location of the aircraft (10), locations of nearby aircraft, or air traffic control information.

E. A controller (140) comprising non-transitory memory (146) with computer readable instructions for performing the computer-implemented method (300) of any of paragraphs D-D19.

E1. The controller (140) of paragraph E, further comprising a processing unit (142) configured to perform the computer-implemented method (300) by executing the computer readable instructions stored in the non-transitory memory (146).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method for reducing brake wear during taxiing of an aircraft, the method comprising:
  determining a sequence to apply brakes of a given set of landing gear that are each cooler than a transition temperature during a brake event, wherein the determining comprises:
    selecting a warmer brake of the brakes to initially apply at a start of the brake event, wherein the selecting the warmer brake comprises selecting the warmer brake based on a predicted energy demand of the brake event, and
    selecting a cooler brake of the brakes to subsequently apply when the warmer brake is released during the brake event;
  applying the warmer brake and the cooler brake in the determined sequence during the brake event; and
  estimating the predicted energy demand of the brake event based on a current velocity of the aircraft, an average taxi velocity of the aircraft, historical taxi data of the aircraft, a current location of the aircraft, locations of nearby aircraft, and air traffic control information.

2. The method of claim 1, wherein the applying the warmer brake and the cooler brake in the determined sequence comprises initially applying the warmer brake at the start of the brake event, and then subsequently applying the cooler brake when releasing the warmer brake.

3. The method of claim 2, further comprising releasing the warmer brake when the warmer brake reaches the transition temperature or an energy of the warmer brake reaches a transition energy threshold.

4. The method of claim 2, further comprising releasing the warmer brake when a velocity of the aircraft decreases below a transition velocity of the warmer brake.

5. The method of claim 4, further comprising predicting the transition velocity based on one or more of a current kinetic energy of the aircraft, a remaining brake energy available for the warmer brake, or a number of the brakes to be applied simultaneously with the warmer brake during the brake event.

6. The method of claim 5, wherein the selecting the warmer brake comprises only selecting brakes for which the transition velocity is less than a current aircraft velocity by more than a buffer velocity value.

7. The method of claim 5, wherein the selecting the warmer brake comprises only selecting brakes for which the transition velocity is less than a transition velocity threshold.

8. The method of claim 5, further comprising estimating a current brake energy for each of the brakes based on a latent heat estimate or an accumulated heat estimate.

9. The method of claim 8, wherein the estimating comprises estimating the latent heat estimate based on brake temperature measurements and estimating the accumulated heat estimate based on an amount of kinetic energy absorbed by the brakes during recent brake events.

10. The method of claim 1, wherein the selecting the warmer brake comprises selecting a warmest subset of the brakes of the given set of landing gear that are cooler than the transition temperature by more than a buffer temperature value.

11. The method of claim 10, wherein the selecting the cooler brake comprises selecting a next warmest subset of the brakes.

12. The method of claim 1, wherein the selecting the warmer brake comprises selecting a highest energy subset of the brakes of the given set of landing gear that are lower in energy than a transition energy threshold by more than a buffer energy value.

13. The method of claim 12, further comprising setting the transition energy threshold to a lower energy value when taxiing to takeoff than when taxiing after landing.

14. The method of claim 1, wherein the applying the warmer brake and the cooler brake in the determined sequence is only performed when operating in a brake wear minimization mode, and wherein the method further comprises:
operating in the brake wear minimization mode when one or more of:
a current aircraft velocity is within an aircraft velocity threshold range;
a temperature of at least one of the brakes is below a cold brake temperature threshold range;
the aircraft is in one or more threshold portions of a flight cycle; or
operating in a normal taxi mode and applying the brakes in a predetermined repeating order when not operating in the brake wear minimization mode.

15. The method of claim 14, wherein the aircraft velocity threshold range comprises velocities between 8 knots and 40 knots, the brake temperature threshold range comprises temperatures below 120° C., and the threshold portions of the flight cycle comprise a beginning portion of a flight cycle prior to takeoff, and an end portion of a flight cycle that occurs after a threshold duration has passed since landing.

16. An aircraft brake system comprising:
brakes; and
a controller that is programmed to:
select, based on a current brake energy of each brake of the brakes or based on a predicted energy demand of a brake event, a warmer subset of the brakes to apply before applying a cooler subset of the brakes during a brake event during aircraft taxiing;
estimate the current brake energy for each of the brakes by adding a latent heat estimate and an accumulated heat estimate;
estimate the latent heat estimate by converting a temperature measurement to an energy value via a known relationship between brake temperature measurements and brake energies;
estimate the accumulated heat estimate based on instances of aircraft deceleration during taxiing and based on one or more of which of the brakes were applied during said instances of aircraft deceleration and based on an amount of kinetic energy lost during said instances of aircraft deceleration; and
only apply brakes for which the current brake energy is less than a transition energy threshold by more than a buffer energy value.

17. The aircraft brake system of claim 16, wherein the controller further is programmed to predict a transition velocity for each brake of the warmer subset of the brakes at which a future energy of each brake of the warmer subset of the brakes reaches a brake energy threshold based on one or more of the current brake energy of each of the warmer subset of the brakes, a number of the brakes to be applied during the brake event, a current aircraft kinetic energy, or an aircraft mass.

18. The aircraft brake system of claim 17, wherein the controller further is programmed to release each brake of the warmer subset of the brakes when aircraft velocity reaches the transition velocity of each brake of the warmer subset of the brakes, and wherein the controller further is programmed to apply one brake of the cooler subset of the brakes when releasing one brake of the warmer subset of the brakes.

19. The aircraft brake system of claim 16, further comprising one or more sensors that are in electrical communication with the controller and are configured to measure aircraft operating conditions and/or brake operating conditions, wherein the one or more sensors comprise a brake temperature sensor that is configured to measure a temperature of at least one of the brakes, a brake pressure sensor that is configured to provide an indication of a braking force applied by at least one of the brakes, a wheel speed sensor that is configured to measure a speed of at least one wheel, and an inertial sensor that is configured to provide an indication of aircraft acceleration and/or aircraft deceleration.

20. The aircraft brake system of claim 19, wherein the controller further is programmed to estimate the current brake energy for each of the brakes based on one or more of the temperature received from the brake temperature sensor, the indication of the applied braking force received from the brake pressure sensor, the wheel speed measurement received from the wheel speed sensor, or the indication of the aircraft deceleration received from the inertial sensor.

* * * * *